United States Patent
Li et al.

(10) Patent No.: US 12,262,728 B2
(45) Date of Patent: Apr. 1, 2025

(54) WATER CONTROL METHOD FOR LOOSENING AND CONDITIONING PROCESS BASED ON NEURAL NETWORK MODEL AND DOUBLE PARAMETER CORRECTION

(71) Applicant: Zhangjiakou Cigarette Factory Co., Ltd., Hebei (CN)

(72) Inventors: Zijuan Li, Hebei (CN); Jiaojiao Chen, Hebei (CN); Shuo Sun, Hebei (CN); Wangchang Miao, Hebei (CN); Yang Gao, Hebei (CN); Zixian Feng, Hebei (CN); Liyuan Zhao, Hebei (CN); Yanling Ma, Hebei (CN); Bo Liu, Hebei (CN); Ting Fang, Hebei (CN); Xiaohui Jia, Hebei (CN); Zheng Zhou, Hebei (CN); Yanshu Ma, Hebei (CN); Jichao Guo, Hebei (CN); Qiao Su, Hebei (CN); Qifeng Zhang, Hebei (CN); Tingting Wu, Hebei (CN); Huixia Yang, Hebei (CN); Haiyang Zhao, Hebei (CN); Suyan Li, Hebei (CN)

(73) Assignee: Zhangjiakou Cigarette Factory Co., Ltd., Zhangjiakou (CN)

( * ) Notice: Subject to any disclaimer, the term of this patent is extended or adjusted under 35 U.S.C. 154(b) by 464 days.

(21) Appl. No.: 17/875,399

(22) Filed: Jul. 27, 2022

(65) Prior Publication Data

US 2023/0067754 A1 Mar. 2, 2023

(30) Foreign Application Priority Data

Aug. 26, 2021 (CN) .......................... 202110991340.5

(51) Int. Cl.
*A24B 3/04* (2006.01)
*A24B 3/06* (2006.01)
(Continued)

(52) U.S. Cl.
CPC .................. *A24B 3/04* (2013.01); *A24B 3/06* (2013.01); *G05B 19/416* (2013.01); *G06N 3/08* (2013.01); *G05B 2219/37371* (2013.01)

(58) Field of Classification Search
CPC .... A24B 3/04; A24B 3/06; A24B 9/00; G05B 19/416; G05B 2219/37371; G05B 13/027; G05B 13/04; G06N 3/08; G06N 3/09
See application file for complete search history.

(56) References Cited

U.S. PATENT DOCUMENTS

| | | | | |
|---|---|---|---|---|
| 6,155,269 A | * | 12/2000 | Franke | A24B 3/04 131/303 |
| 2015/0047657 A1 | * | 2/2015 | Wu | A24B 13/02 131/306 |
| 2023/0085089 A1 | * | 3/2023 | Liu | G06N 5/01 706/12 |

FOREIGN PATENT DOCUMENTS

| | | | | |
|---|---|---|---|---|
| CN | 113491341 A | * | 10/2021 | |
| CN | 111045326 B | * | 12/2022 | ........... G05B 13/042 |

OTHER PUBLICATIONS

Ronghua Duan, Design of Control System for the Outlet Moisture Content of the Looseness and Moisture Regain Based on Expert-fuzzy PID Control, Computer Measurement & Control, Jan. 2019, pp. 85-91, vol. 27 (1), China Academic Journal Electronic Publishing House.

(Continued)

*Primary Examiner* — Zhipeng Wang

(57) ABSTRACT

Disclosed in the present invention is a control method for water supply during loosening and conditioning based on a neural network model and a dual parameter correction. The method comprises: establishing a neural network-based model for predicting the amount of water supplied during loosening and conditioning; predicting and distributing the total water supplied; and correcting the model based on material balance calculation and deviation. In the present application, when there is a large deviation in outlet moisture, the dual correction control system combining the material balance calculation and the moisture deviation is used for correction to improve the stability and precise control of the outlet moisture during the loosening and conditioning process.

3 Claims, 3 Drawing Sheets

(51) Int. Cl.
 G05B 19/416 (2006.01)
 G06N 3/08 (2023.01)

(56) References Cited

OTHER PUBLICATIONS

Xiufang Li, Optimization Design of Control System in Tobacco Strips Loosening and Conditioning, Acta Tabacaria Sinica, 2015, pp. 34-41, vol. 21 (3), China Academic Journal Electronic Publishing House.

Yusheng Wu et al., Study and Application of Loosening and Conditioning Technology Based on Zero Moisture Exhaust, Tobacco Science & Technology, 2016, pp. 76-81, vol. 49 (6), China Academic Journal Electronic Publishing House.

Yuhe Zhang et al., Design and Application of Low Processing Intensity Loosening & Conditioning System, Tobacco Science & Technology, 2015, pp. 89-92, vol. 48 (10), China Academic Journal Electronic Publishing House.

* cited by examiner

WATER CONTROL METHOD FOR LOOSENING AND CONDITIONING PROCESS BASED ON NEURAL NETWORK MODEL AND DOUBLE PARAMETER CORRECTION

CROSS REFERENCE TO RELATED APPLICATIONS

This application is based upon and claims priority to Chinese Patent Application No. 202110991340.5, filed on Aug. 26, 2021, the entire contents of which are incorporated herein by reference.

FIELD OF TECHNOLOGY

The present invention relates to a tobacco primary processing field, and in particular to a method for controlling water supply during loosening and conditioning process based on a neural network model and a double parameter correction.

BACKGROUND

A loosening and conditioning process is one of the key processes in tobacco primary processing. Its main technological task is to loosen tobacco sheets, increase the moisture and temperature of the tobacco sheets, and improve the processing resistance of tobacco leaves. At present, loosening and conditioning machines used in a cigarette industry have the characteristics of good loosening effect and good processing resistance. However, there are common problems such as poor stability of outlet moisture and lag in feedback from a water supply control system.

In response to these problems, tobacco workers have carried out a lot of researches to improve the stability of moisture control at the outlet of the loosening and conditioning machine from the aspects of system improvement, parameter optimization, and model establishment etc. Duan Ronghua adopts a control method of professional (fuzzy processing)+conventional PID to realize the automatic control of moisture at the outlet of loosening and conditioning, and improve the stability of moisture at the outlet of loosening and conditioning. Li Xiufang improves a return air system and a moisture control method of the loosening and conditioning machine, and reduces the fluctuation of outlet moisture and outlet temperature. Wu Yusheng et al. designs and optimizes a parameter combination to improve a CPK value of the moisture at the outlet of loosening and conditioning. Zhang Yuhe et al. improves a structure of rake nails in the loosening and conditioning cylinder, improves the uniformity of heating and conditioning of the material, and improves the processing quality of the loosening and conditioning.

The above studies are based on the precise control of the moisture at the outlet by the loosening and conditioning machine and the water supply system of the loosening and conditioning machine. The inventors of the pending application found that, although the stability of the moisture at the outlet of the loosening and conditioning has been improved to a certain extent, with regard to the self-adaptive control of the water supplied during the loosening and conditioning as well as the improvement of outlet moisture control capabilities, there are still deficiencies.

FIG. 1 is the existing control method of water supply for the loosening and conditioning. The formula for calculating the amount of water supplied is calculated from the actual value of the inlet moisture, the set value of the outlet moisture, the actual flow of the scale at inlet and the steam coefficient. The method of setting the steam coefficient is that equipment personnel give an empirical value according to the set value of the outlet moisture of each brand of cigarette, and then adjust according to the actual situation of the outlet moisture, and finally determine the steam coefficient for curing. The system adopts a control method of simultaneously water supply at the inlet and outlet. The travel time of the material from a conditioning nozzle to a moisture meter at the outlet of the loosening and conditioning is about 180 s, and the lag time of the system feedback is long. In the process of production and operation, it is necessary to manually adjust the amount of water supplied at the inlet and the amount of water supplied at the outlet to realize the adjustment of the outlet moisture. When the deviation between the actual value of the outlet moisture and the set value of the outlet moisture is small, adjusting the amount of water supplied at the outlet. When the deviation is large, adjusting the amount of water supplied at the inlet. In most cases, adjusting the amount of water supplied at the outlet. In the water supplied control system of loosening and conditioning, the actual value of the outlet moisture does not participate in the calculation of the amount of water supplied, and is often used as a reference for manual adjustment of the amplitude, so the system is a classic open-loop control. The amount of water supplied is greatly affected by factors such as the moisture, grade, place of origin, and production environment of incoming tobacco leaves. It can be seen that the existing control methods cannot achieve accurate and intelligent control of the outlet moisture.

SUMMARY

To overcome the above shortcomings, in the present application, a loosening and conditioning equipment of a tobacco primary processing production line is taken as an object, and a method based on an existing calculation formula for the water amount supplied and the "water supply adjustment at the inlet and outlet simultaneously" is improved into a control method for predicting the amount of water supplied by means of the neural network prediction model; and when there is a large deviation in outlet moisture, the dual correction control system combining the material balance calculation and the moisture deviation is used for correction to improve the stability and precise control of the outlet moisture during the loosening and conditioning process.

The technical solution adopted by the present invention to solve its technical problems is:

A control method for water supply during loosening and conditioning process based on a neural network model and a double parameter correction, comprising:

S1, establishing a neural network-based model for predicting the amount of water supplied during the loosening and conditioning;

using historical production data, taking an inlet moisture and set values of an outlet moisture in a loosening and conditioning process as input values, and the amount of water supplied as an output value, setting a training target of the model to 0.05 (a deviation of the amount of water supplied), a training speed to 0.01, and a maximum number of steps to 100 to conduct a neural network training to establish the neural network-based model for predicting the amount of water supplied during the loosening and conditioning;

S2, predicting and distributing the total water supplied;
collecting parameters under the current production conditions, and based on the neural network-based model obtained in S1, obtaining an optimal total water supplied corresponding to the set value of the outlet moisture; then, according to distribution coefficients of water supply at an inlet and an outlet, distributing the amount of water supplied at the inlet and the amount of water supplied at the outlet;

S3, correcting the model based on a material balance calculation correction and a deviation correction S3.1, making a definition as follows:
the material balance calculation refers to predicting the total water supplied TotalWater(T) in a sampling period T through a principle of input-output quality conservation during the loosening and conditioning process, and the calculation formula is as follows:

$$TotalWater(T) = F \times T \times M_C + C - (Q + F \times T \times M_R) = F \times T \times (M_C - M_R) - (Q - C)$$

in the formula, Q is a steam injection amount in the sampling period T in kg;
F is the flow rate of an electronic scale in kg/h;
T represents one sampling period in s;
C is water consumption in kg;
$M_C$ represents an average value of the outlet moisture in the sampling period T in percentage;
$M_R$ represents an average value of the inlet moisture in the sampling period T in percentage; the deviation refers to the size that the actual value of the outlet moisture deviates from the set value of the outlet moisture, and the deviation value is defined as $\Delta S$, wherein the calculation formula is as follows:

$$\Delta S = M_C - M_S$$

in the formula, $M_C$ is the actual value of the outlet moisture in percentage; $M_S$ is the set value of the outlet moisture in percentage;

S3.2, setting the sampling period;
the set value of the sampling period T is the frequency that the system adjusts the water supply flow rate, which is set according to the time that is taken for the material to travel from a back pump at the back end of the equipment to an outlet moisture meter;

S3.3, the material balance calculation correction;
in the sampling period T, a corrected water supply flow rate $\Delta FlowRate(1)$ based on the material balance calculation of the input and output of the loosening and conditioning process is as follows:

$$\Delta FlowRate(1) = \frac{F \times T \times (M_C - M_R) - (Q - C)}{T} = \frac{TotalWater(T)}{T}$$

S3.4, the deviation correction;
in one sampling period T, a corrected water supply flow rate $\Delta FlowRate(2)$ by the deviation is:

$$\Delta FlowRate(2) = \frac{\Delta S(T) \times F(T)}{T}$$

in the formula, F (T) is the flow rate of the electronic scale in kg/h;

S3.5, selecting of the double correction parameters;
according to the deviation of the outlet moisture, performing correcting based on the material balance calculation or the deviation correction;
if the deviation of the outlet moisture is greater or equal to 0.5%, performing correcting by using the value of the material balance calculation correction, which is fed back to the total water supplied for correction; if the deviation of the outlet moisture is less than 0.5%, correcting by using the value of the deviation correction, which is fed back to the amount of water supplied at the outlet for correction.

The beneficial effects brought by the present invention are:

The present application proposes a control method for water supply during loosening and conditioning based on a neural network model and a double parameter correction, which is used to control and adjust the moisture at the outlet during the loosening and conditioning process, and at the same time obtain a deviation benchmark of the outlet moisture, and according to the deviation between the actual value and the set value of the outlet moisture, utilize the corresponding correction system:

(1) Based on the neural network, the control model of the water supply of the loosening and conditioning machine is established, and the set values of the inlet moisture and outlet moisture of the loosening and conditioning machine are used as input factors, and the amount of water supplied is used as the output factor to predict the total amount of water supplied, which changes the feedback lag of the original system and the manner of manually adjusting the amount of water supplied at the front or back end according to the outlet moisture, improves the intelligence level of the loosening and conditioning process; at the same time, the model has self-learning capabilities, and the model is trained by continuously collecting production data to improve the prediction accuracy of the system;

(2) According to the deviation between the actual value and the set value of the outlet moisture, corresponding deviation correction is conducted respectively: if the deviation of the outlet moisture is greater or equal to 0.5%, performing correcting by using the values of the material balance calculation, which is fed back to the total water supplied; when the deviation of the moisture at the outlet is less than 0.5%, correcting by using the value of the deviation, which is fed back to the amount of water supplied at the outlet.

By analyzing application effects and comparing the standard deviation of the moisture at the outlet of loosening and conditioning before and after improvement, the standard deviation of the moisture at the outlet of the loosening and conditioning decreases from 0.61% to 0.34%, which means a decrease of 0.27%, and the stability of the outlet moisture is significantly improved.

BRIEF DESCRIPTION OF THE DRAWINGS

The present invention will be further described below in conjunction with the accompanying drawings and specific embodiments.

DESCRIPTION OF THE EMBODIMENTS

Figure 1:
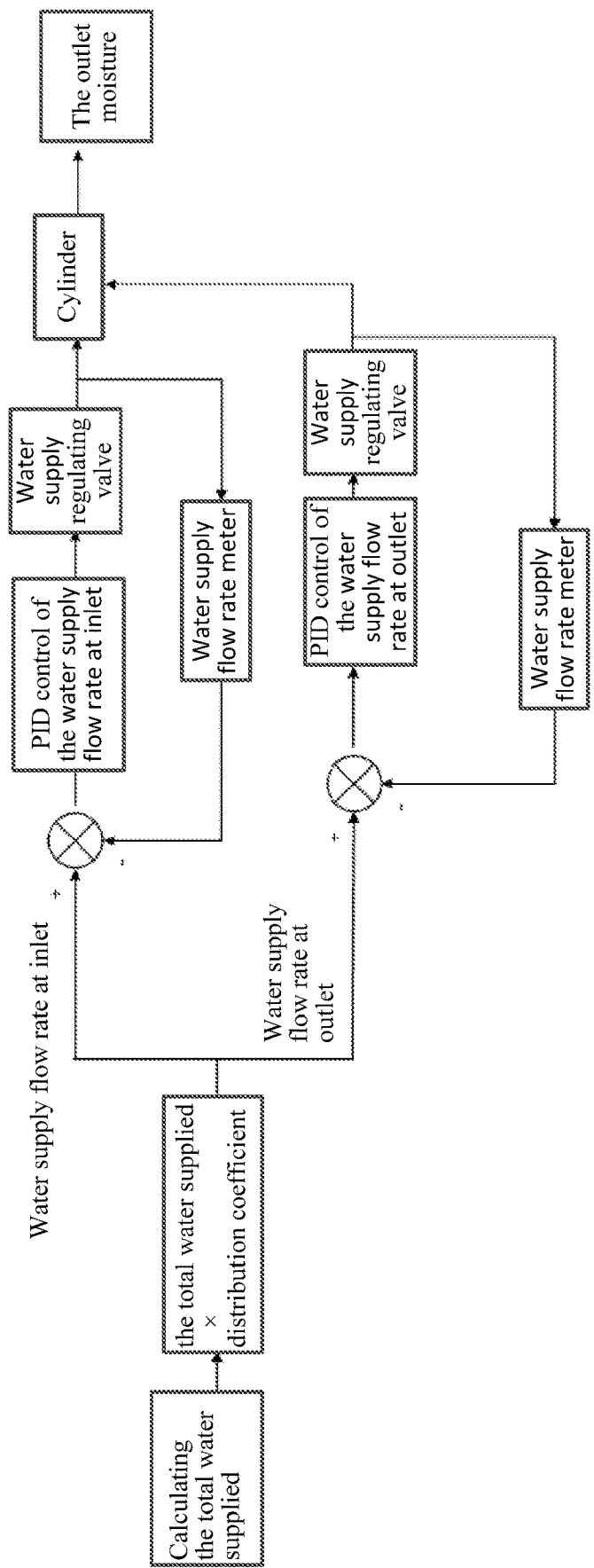
FIG. 1 is a block diagram of a water supply control flow of loosening and conditioning before the improvement.

The technical solutions in the embodiments of the present invention will be clearly and completely described below with reference to the accompanying drawings in the embodiments of the present invention. Obviously, the described embodiments are only a part of the embodiments of the present invention, rather than all the embodiments. Based on the embodiments of the present invention, all the other embodiments obtained by those of ordinary skill in the art without inventive effort are within the scope of the present invention.

Embodiment 1

A control method for water supply during loosening and conditioning based on a neural network model and a double parameter correction, comprising:
  S1, establishing a neural network based model for predicting the amount of water supplied during the loosening and conditioning;
  using historical production data, taking an inlet moisture and a set value of an outlet moisture in a loosening and conditioning process as input values, and the amount of water supplied as an output value, setting a training target of the model to 0.05, a training speed to 0.01, and a maximum number of steps to 100, performing a neural network training to establish the neural network-based model for predicting the amount of water supplied during the loosening and conditioning, wherein the neural network comprises a three-layer structure of an input layer, a hidden layer and an output layer;
  S2, predicting and distributing the total water supplied;
  collecting parameters under the current production conditions, and based on the neural network-based model obtained in S1, obtaining an optimal total water supplied corresponding to the set value of the outlet moisture; then, according to distribution coefficients of water supply at an inlet and an outlet, distributing the amount of water supplied at the inlet (front water supplied) and the amount of water supplied at the outlet (back water supplied);
  S3, correcting the model based on a material balance calculation and a deviation;
  S3.1, making a definition as follows:
  the material balance calculation refers to predicting the total water supplied TotalWater(T) (kg) in a sampling period T through a principle of input-output quality conservation during the loosening and conditioning process, and the calculation formula is as follows:

$$TotalWater(T) = F \times T \times M_C + C - (Q + F \times T \times M_R)$$
$$= F \times T \times (M_C - M_R) - (Q - C)$$

in the formula, Q is a steam injection amount in the sampling period T in kg;
F is the flow rate of an electronic scale in kg/h;
T represents one sampling period in s;
C is water consumption in kg;

$M_C$ represents an average value of the outlet moisture in the sampling period T in percentage;
$M_R$ represents an average value of the inlet moisture in the sampling period T in percentage; the deviation refers to the size that the actual value of the outlet moisture deviates from the set value of the outlet moisture, and the deviation value is defined as $\Delta S$, wherein the calculation formula is as follows:

$$\Delta S = M_C - M_S$$

in the formula, $M_C$ is the actual value of the outlet moisture in percentage; $M_S$ is the set value of the outlet moisture in percentage;
  S3.2, setting the sampling period;
  the set value of the sampling period T is the frequency that the system adjusts the flow rate of water supply, which is set according to the time that is taken for the material to travel from a back pump (the pump at the back end of the equipment) to an outlet moisture meter; the smaller the sampling period T, the more frequent the adjustment of the amount of water supplied during the loosening and conditioning;
  after on-site measurement, the sampling period of the water supply control system is 12 s;
  S3.3, the material balance calculation correction;
  in one sampling period T, a corrected flow rate of total water supplied $\Delta FlowRate(1)$ (kg/h) based on the material balance calculation of the input and output of the loosening and conditioning process is as follows:

$$\Delta FlowRate(1) = \frac{F \times T \times (M_C - M_R) - (Q - C)}{T} = \frac{TotalWater(T)}{T};$$

It can be seen from the above formula that a water consumption standard is the average value of the water consumption of historical production batches. If the water consumption standard and the steam injection amount are constant, when the water supply flow rate increases, the outlet moisture also increases; when the water supply flow rate decreases, the outlet moisture also decreases;
  S3.4, the deviation correction;
  in one sampling period T, a corrected flow rate of water supply at outlet $\Delta FlowRate(2)$ (kg/h) by the outlet moisture deviation is:

$$\Delta FlowRate(2) = \frac{\Delta S(T) \times F(T)}{T}$$

in the formula, F(T) is the flow rate of the electronic scale in kg/h;
If the deviation value $\Delta S(T)$ is positive, the actual value of the outlet moisture is greater than the set value of the outlet moisture, and the amount of water supplied should be decreased; when the deviation value $\Delta S(T)$ is negative, the actual value of the outlet moisture is less than the set value of the outlet moisture, the amount of water supplied should be increased; the greater the absolute value of $\Delta S(T)$, the larger the adjustment value $\Delta FlowRate(2)$ of the water supplied;
  S3.5, selecting of the double correction parameters;
  according to the deviation of the outlet moisture, performing the material balance calculation correction or the deviation correction;
  if the deviation of the outlet moisture is greater or equal to 0.5%, performing correction by using the value obtained from the material balance calculation correction, which is fed back to the total water supplied for correction; if the deviation of the outlet moisture is less than 0.5%, performing correction by using the value obtained from the deviation correction, which is fed back to the amount of water supplied at the outlet for correction. If the deviation value is positive, the amount of water supplied should be decreased, a subtraction is conducted; when the deviation value is negative, the amount of water supplied should be increased, an addition is conducted.

Embodiment 2

Based on Embodiment 1, changing the current control method of the amount of water supplied during the loosening and conditioning to a prediction method based on neural network model, establishing a prediction model for the amount of water supplied during the loosening and conditioning, collecting the parameters under the current production conditions by the prediction system, and obtaining the optimal amount of water supplied corresponding to the set value of the outlet moisture by the model; then according to the distribution coefficients of water supplied at the inlet and the outlet (7:3 in this embodiment), distributing the amount of water supplied at the inlet and the amount of water supplied at the outlet.

Figure 2:
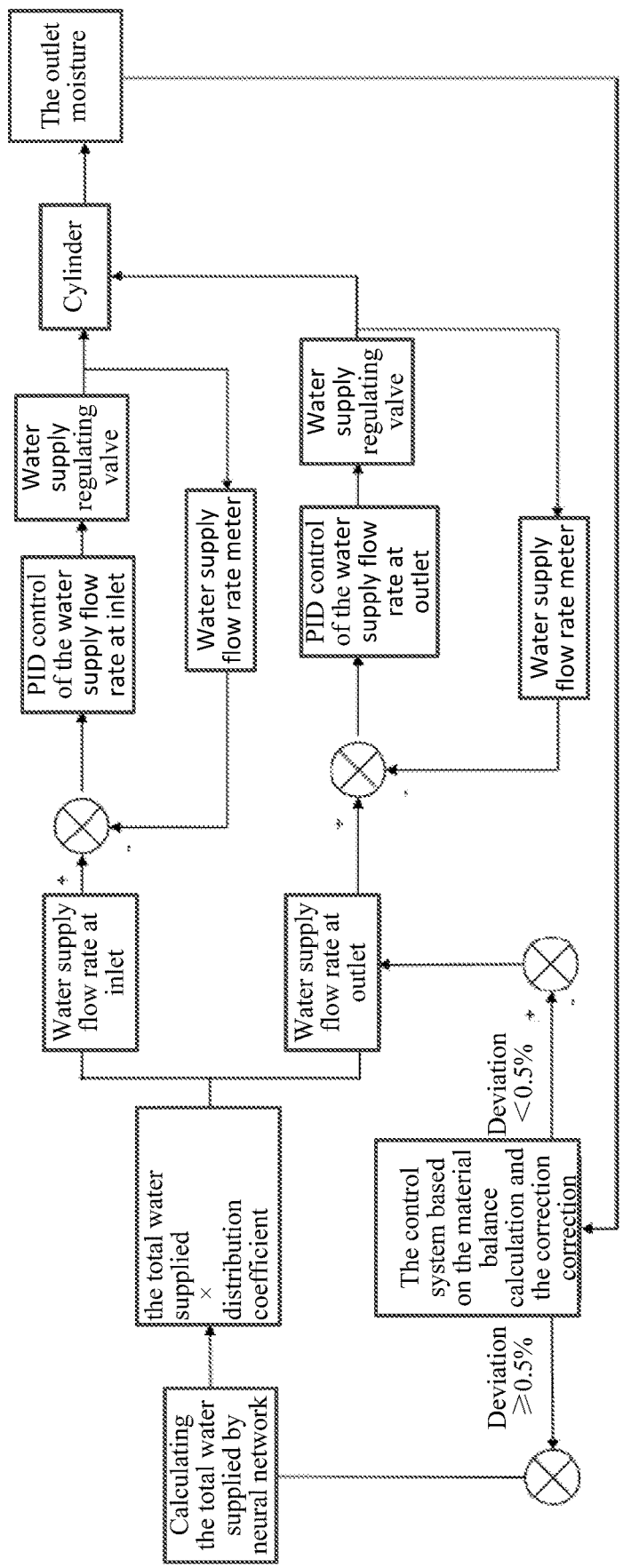
FIG. 2 is a block diagram of a water supply control flow of loosening and conditioning after the improvement.

In this embodiment, the actual value of outlet moisture is supplied to the feedback control, and at the same time, a dual correction system combining the material balance calculation and moisture deviation control is supplied to the prediction system. The deviation between the actual value of the outlet moisture and the set value of the outlet moisture is used as the basis for adjusting the total water supplied or the water supplied at outlet, as well as the adjustment range, so as to achieve accurate and intelligent control of the outlet moisture, see FIG. 2 for details.

$$\text{Water} = F \times \frac{100 - M_{RS}}{100 - (M_{CS} - S)} - F;$$

In the formula, Water represents the amount of water supplied in kg;

F is the actual flow rate of the scale in kg/h;

$M_{RS}$ is the actual value of inlet moisture in percentage;

$M_{CS}$ is the actual value of outlet moisture in percentage;

S is a steam coefficient, and the steam coefficient of the diamond brand cigarette (Welcome, Hard) of this embodiment is 0.5.

The on-site test calculation results show that:

When the adjustment range is small, the numerical control accuracy of deviation correction is higher, and the deviation of material balance calculation is better in adjusting the feedback speed.

Embodiment 3

Application Test

Material: "Diamond brand (Welcome, Hard)" cigarettes.

Equipment and instruments: Roller-type loosening and conditioning machine (WQ3237 type); online moisture meter (PSC460 type).

Test method: the data collected by a cut tobacco-making information management system is used, and 20 batches of the data before and after the improvement are used for comparative analysis.

Figure 3:
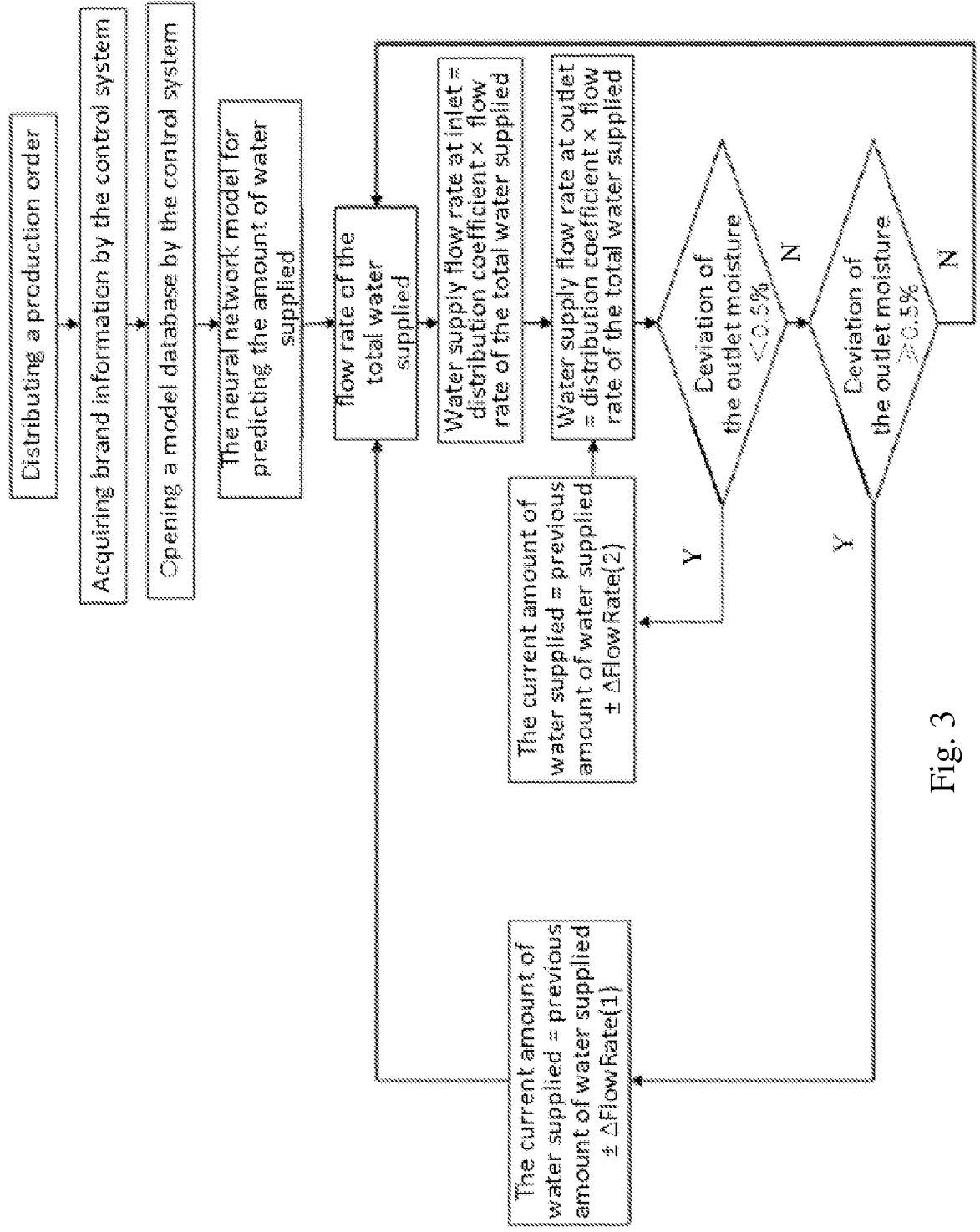
FIG. 3 is a feedback flow chart of a water supply control system for loosening and conditioning after applying the control method of the present application.

Based on FIG. 3, the method of Embodiment 1 obtains a comparison of the standard deviation of the outlet moisture before and after the improvement, and the results are shown in Table 1.

TABLE 1

| Serial number | Standard deviation before the improvement | Standard deviation after the improvement |
|---|---|---|
| 1 | 0.65 | 0.37 |
| 2 | 0.71 | 0.31 |
| 3 | 0.68 | 0.4 |
| 4 | 0.59 | 0.32 |
| 5 | 0.67 | 0.29 |
| 6 | 0.63 | 0.38 |
| 7 | 0.62 | 0.32 |
| 8 | 0.72 | 0.31 |
| 9 | 0.59 | 0.28 |
| 10 | 0.6 | 0.34 |
| 11 | 0.54 | 0.41 |
| 12 | 0.61 | 0.35 |
| 13 | 0.58 | 0.37 |
| 14 | 0.56 | 0.31 |
| 15 | 0.53 | 0.28 |
| 16 | 0.61 | 0.26 |
| 17 | 0.63 | 0.34 |
| 18 | 0.62 | 0.36 |
| 19 | 0.57 | 0.39 |
| 20 | 0.49 | 0.34 |
| mean | 0.61 | 0.34 |

It can be seen from Table 1 that after the improvement, the standard deviation of the outlet moisture of the loosening and conditioning decreases from 0.61% to 0.34%, which means a decrease of 0.27%, and the stability of the outlet moisture is significantly improved.

Embodiment 4

A control system for water supply during loosening and conditioning based on a neural network model and a double parameter correction.

The system is used for implement the above-mentioned control method for water supply during loosening and conditioning based on a neural network model and a double parameter correction, comprising:

a creating unit for a neural network-based model for predicting the amount of water supplied during the loosening and conditioning;

The unit uses historical production data, takes an inlet moisture and a set value of an outlet moisture during a loosening and conditioning process as input values, and the amount of water supplied as an output value, establishes the neural network-based model for predicting the amount of water supplied during the loosening and conditioning;

Predicting and distributing unit for the total water supplied;

The unit collects parameters under the current production conditions, and based on the prediction model, obtains an optimal total water supplied corresponding to the set value of the outlet moisture; then, according to distribution coefficients of water supply at an inlet and an outlet, distributes the amount of water supplied at the inlet and the amount of water supplied at the outlet;

a model correction unit;

According to the size of a deviation of the outlet moisture, the unit performs a correction based on the material balance calculation or the deviation;

if the deviation of the outlet moisture is greater or equal to 0.5%, performing correcting by using the value of the material balance calculation correction, which is fed back to the total water supplied for correction; if the deviation of the outlet moisture is less than 0.5%, performing correcting by using the value of the deviation correction, which is fed back to the amount of water supplied at the outlet for correction.

It should be noted that the above are only preferred embodiments of the present invention, and are not intended to limit the present invention. Although the present invention has been described in detail with reference to the foregoing embodiments, for those skilled in the art, it is still possible to modify the technical solutions recorded in the foregoing embodiments, or equivalently replace some technical features thereof. Any modifications, equivalent replacements, improvements, etc. made within the spirit and principle of the present invention shall be included in the protection scope of the present invention.

The invention claimed is:

1. A control method for water supply during loosening and conditioning based on a neural network model and a double parameter correction, comprising:

S1, establishing a neural network-based model for predicting the amount of water supplied during loosening and conditioning;

using historical production data, taking an inlet moisture and a set value of an outlet moisture in a loosening and conditioning process as input values, and the amount of water supplied as an output value, training a neural network to establish the neural network-based model for predicting the amount of water supplied during loosening and conditioning;

S2, predicting and distributing the total water supplied;

collecting parameters under the current production conditions, and based on the neural network-based model obtained in S1, obtaining an optimal total water supplied corresponding to the set value of the outlet moisture; then, according to distribution coefficients of water supply at an inlet and an outlet, distributing the amount of water supplied at the inlet and the amount of water supplied at the outlet;

S3, correcting the model based on a material balance calculation correction and a deviation correction according to the deviation that the actual value of the outlet moisture deviates from the set value of the outlet moisture, performing the material balance calculation correction or the deviation correction;

when the deviation of the outlet moisture is greater or equal to 0.5%, performing correcting by using the value from the material balance calculation correction, which is fed back to the total water supplied for correction; when the deviation of the outlet moisture is less than 0.5%, performing correcting by using the value from the deviation correction, which is fed back to the amount of water supplied at the outlet for correction.

2. The control method for water supply during loosening and conditioning based on a neural network model and a double parameter correction according to claim 1, wherein S3 comprises:

S3.1, making a definition as follows:

the material balance calculation refers to predicting the total water supplied TotalWater(T) in a sampling period T through a principle of input-output quality conservation during the loosening and conditioning process, and the calculation formula is as follows:

$$TotalWater(T) = F \times T \times M_C + C - (Q + F \times T \times M_R)$$
$$= F \times T \times (M_C - M_R) - (Q - C)$$

in the formula, Q is a steam injection amount in the sampling period T in kg;

F is the flow rate of an electronic scale in kg/h;

T represents one sampling period in s;

C is water consumption in kg;

$M_C$ represents an average value of the outlet moisture in the sampling period T in percentage;

$M_R$ represents an average value of the inlet moisture in the sampling period T in percentage;

the deviation refers to the size that the actual value of the outlet moisture deviates from the set value of the outlet moisture, and the deviation value is defined as $\Delta S$, wherein the calculation formula is as follows:

$$\Delta S = M_C - M_S$$

in the formula, $M_C$ is the actual value of the outlet moisture in percentage; $M_S$ is the set value of the outlet moisture in percentage;

S3.2, setting the sampling period;

the set value of the sampling period T is the frequency that the system adjusts the water supply flow rate, which is set according to the time that is taken for the material to travel from a back pump to an outlet moisture meter;

S3.3, correcting based on the material balance calculation correction;

in one sampling period T, a corrected water supply flow rate $\Delta FlowRate(1)$ based on the material balance calculation of the input and output of the loosening and conditioning process is as follows:

$$\Delta FlowRate(1) = \frac{F \times T \times (M_C - M_R) - (Q - C)}{T} = \frac{TotalWater(T)}{T}$$

S3.4, correcting based on the deviation correction;

in one sampling period T, a corrected water supply flow rate $\Delta FlowRate(2)$ by the deviation of the outlet moisture is:

$$\Delta FlowRate(2) = \frac{\Delta S(T) \times F(T)}{T}$$

in the formula, F(T) is the flow rate of the electronic scale in kg/h;

S3.5, selecting of the double correction parameters;

according to the deviation of the outlet moisture, performing the material balance calculation correction or the deviation correction.

3. The control method for water supply during loosening and conditioning based on a neural network model and a double parameter correction according to claim 1, wherein, in S1, a training target of the model is set to 0.05, a training speed is 0.01, and a maximum number of steps is 100.

* * * * *